United States Patent [19]
Zaidi

[11] Patent Number: 5,859,994
[45] Date of Patent: Jan. 12, 1999

[54] APPARATUS AND METHOD FOR MODIFYING INSTRUCTION LENGTH DECODING IN A COMPUTER PROCESSOR

[75] Inventor: Syed Ahmad Abbas Zaidi, Santa Clara, Calif.

[73] Assignee: Intel Corporation, Santa Clara, Calif.

[21] Appl. No.: 970,597

[22] Filed: Nov. 14, 1997

Related U.S. Application Data

[63] Continuation of Ser. No. 696,113, Aug. 12, 1996, abandoned, which is a continuation of Ser. No. 343,212, Nov. 22, 1994, abandoned, which is a continuation of Ser. No. 927,580, Aug. 10, 1992, abandoned.

[51] Int. Cl.$^6$ ............................................. G06F 9/30
[52] U.S. Cl. ................................... 395/385; 395/800.32
[58] Field of Search ..................... 395/800.01, 800.24, 395/800.32, 500, 376, 380, 381, 384–389, 580

[56] References Cited

U.S. PATENT DOCUMENTS

| | | |
|---|---|---|
| 4,394,735 | 7/1983 | Satoh et al. ............................... 395/375 |
| 4,504,927 | 3/1985 | Callan ....................................... 395/275 |
| 4,556,938 | 12/1985 | Parker et al. ............................. 395/375 |
| 4,847,759 | 7/1989 | Oklobdzija ............................... 395/425 |
| 5,109,511 | 4/1992 | Nitta et al. ................................ 395/650 |
| 5,123,096 | 6/1992 | Matuo ....................................... 395/375 |
| 5,233,696 | 8/1993 | Suzuki ...................................... 395/375 |
| 5,293,592 | 3/1994 | Fu et al. ................................... 395/375 |
| 5,303,358 | 4/1994 | Baum ....................................... 395/375 |
| 5,371,864 | 12/1994 | Chuang .................................... 395/375 |
| 5,408,625 | 4/1995 | Narita et al. ............................. 395/375 |
| 5,513,330 | 4/1996 | Stiles ........................................ 395/375 |
| 5,535,347 | 7/1996 | Grochowski et al. ................... 395/375 |

*Primary Examiner*—Alpesh M. Shah
*Attorney, Agent, or Firm*—Blakely, Sokoloff, Taylor & Zafman LLP

[57] ABSTRACT

Apparatus for detecting move instructions in which only registers are involved. The apparatus generates signals to disable the inclusion of any SIB byte, displacement bytes and immediate bytes from the instruction length when a move instruction which only requires processor registers is encountered. The apparatus uses the generated signals for instruction length calculation and instruction prefetch pointer generation.

13 Claims, 3 Drawing Sheets

| PREFIX | PREFIX | PREFIX | PREFIX |
|---|---|---|---|

| OPCODE | MODR/M | SIB | DISPLACEMENT | IMMEDIATE |
|---|---|---|---|---|

(B)

PREFIX    OPCODE    MOD REG R/M

| 0 F | | | CR0/CR2/CR3/CR4 FROM REGISTER |
|---|---|---|---|
| 0000 1111 | 0010 0010 | 11 CR3 REG | |

(C)

| 0000 1111 | 0010 0000 | 11 EEE REG | REGISTER FROM CR3 |
|---|---|---|---|

APPARATUS AND METHOD FOR MODIFYING INSTRUCTION LENGTH DECODING IN A COMPUTER PROCESSOR

This is a continuation of application Ser. No. 08/696,113, filed Aug. 12, 1996, now abandoned, which is a continuation of application Ser. No. 08/343,212, filed Nov. 22, 1994, now abandoned, which is a continuation of application Ser. No. 07/927,580, filed Aug. 10, 1992, now abandoned.

BACKGROUND OF THE INVENTION

1. Field of the Invention

This invention relates to computer processors and, more particularly, to methods and apparatus for allowing a computer processor to process instructions written for older processors which would normally generate an error response in the newer processor.

2. History of the Prior Art

The most prevalent design of personal computers at the present time is based on the microprocessors manufactured by Intel Corporation including the 8086, 8088, 80286, i386™, and i486™ microprocessors (hereinafter referred to as the Intel microprocessors).

The Intel microprocessors have a relatively involved memory architecture. This structure grew because of the constant attempt to allow later microprocessor models to run programs designed for the earlier microprocessors while, at the same time, increasing the amount of memory and the speed of operation of the later microprocessors.

Because of the need to make each more advanced Intel microprocessor run the instructions which may be run on older Intel microprocessors, the instruction set for the Intel microprocessors has become quite complicated. Instructions are of variable length and can be from one to fifteen bytes. An instruction may consist of several fields. The instruction fields may include up to four bytes of prefix information, one byte of opcode, zero or one byte of ModR/M information, one byte of scale/index/base (SIB) information, up to four bytes of displacement information, and up to four bytes of immediate information. All of the fields other than the opcode are optional; thus, an instruction of the minimum length is a one byte instruction which contains only the opcode defining a particular operation. The details of the individual elements of instructions running on the presently most advanced of the Intel microprocessors are described in *i486 Microprocessor, Programmer's Reference Manual*, published by Osborne McGraw-Hill, 1990, pp. 26-1 et seq.

Many of the instructions which run on the more modern Intel microprocessors will not run on earlier Intel microprocessors. For example, the SIB byte is present only in thirty-two bit instructions and, consequently, has an effect only with i386 and later Intel microprocessors which are capable of using these instructions. On the other hand, it has been discovered that certain programs written for earlier processors contain instructions which may be interpreted by the more advanced processors in a manner which causes incorrect operation of the more advanced processors. It is desirable that the more advanced processors be capable of running these programs. It is therefore desirable to correct the invalid results produced in later Intel microprocessors by various instructions in programs designed for earlier Intel microprocessors.

SUMMARY OF THE INVENTION

It is, therefore, an object of the present invention to allow microprocessors running the instruction set of the Intel microprocessors to utilize software designed for earlier Intel microprocessors.

It is another, more specific, object of the present invention to provide apparatus for aliasing bits of instructions in the Intel instruction set so that instructions which might otherwise be considered invalid or disrupt the processor operation are accepted for processing.

These and other objects of the present invention are realized in a decoder circuit for a microprocessor which in addition to other decoder functions, detects move instructions in which only registers are involved, and generates signals to disable the inclusion of a length value for any SIB byte or any displacement byte when such a move instruction is detected.

These and other objects and features of the invention will be better understood by reference to the detailed description which follows taken together with the drawings in which like elements are referred to by like designations throughout the several views.

BRIEF DESCRIPTION OF THE DRAWINGS

FIGS. 1(a)–1(c) are diagrams of a general instruction format and two individual instructions used in the instruction set for Intel microprocessors.

DETAILED DESCRIPTION OF THE INVENTION

Figure 2:
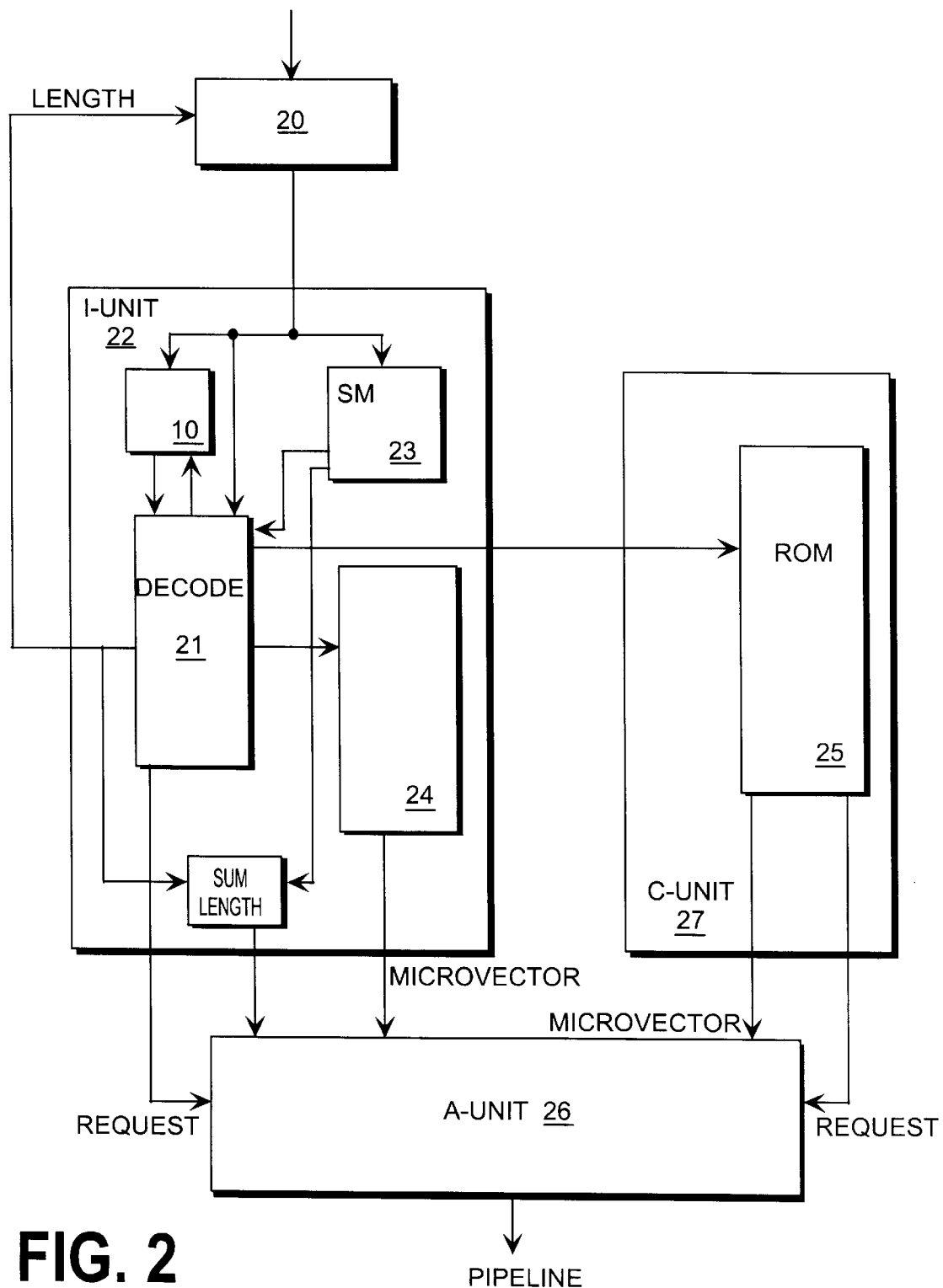
FIG. 2 is a block diagram of the decoding portion of a microprocessor which may include the present invention.

The Intel microprocessors use two basic forms of memory management, segmentation memory management and virtual memory management (paging).

Segmentation memory management allows the address space to be divided into multiple independent address spaces (segments) each defined by a segmentation base address and a segment length. The information stored in any particular segment has an address which is a combination of the segment base address and an offset into the segment.

In order to access memory using the segmentation form of memory management, an application program uses an address referred to as a logical address which includes various values used to compute an offset into a segment. Segmentation hardware of the memory management portion of the computer translates the logical address into a linear address which is both the address of the segment and an offset address within the continuous segment address space. To determine an offset address within a segment, a displacement, an index, a base, and a scale may be used and combined in various ways. The offset is combined with the segment base address to provide the linear address. If paging is operating, paging hardware then translates the linear address into a physical address. Otherwise, the linear address is the physical address.

Thus, information is accessed using the logical address provided by a program; the logical address is translated into the linear address by the segmentation memory management unit in the manner described. This linear address is considered to be the physical address or is then translated into a physical address by the paging system if paging is enabled.

The Intel microprocessors utilize the instructions themselves and registers to store the various components which are used to form the linear addresses used in segmentation memory management. For example, instructions include displacement values used to compute the offset. The instructions also designate registers in which the base, index, and scale values used to compute the offset into each segment in memory are stored.

Thus, the instructions used by the Intel line of microprocessors include fields used to address segments of varying types using displacement, base, index, and scale values. FIG. 1(a) illustrates the instruction format used in the Intel i486 microprocessor. As may be seen, an instruction is divided into a plurality of fields. The instructions are of variable length and can be from one to fifteen bytes. All of the fields other than the opcode are optional. The minimum instruction is a one byte instruction which contains only the opcode defining a particular operation.

A first field may include from one to four bytes of prefix information. A prefix precedes and somehow modifies what the instruction normally accomplishes. A prefix may vary the meaning of the opcode which indicates what an instruction is to accomplish; a prefix may change the segment register to some register other than a default register; a prefix may change the address from sixteen to thirty-two bits; a prefix may change the data size from sixteen to thirty-two bits; a prefix may cause an instruction to be repeated with each element of a string; or a prefix may indicate a locked read/modify/write sequence. Logical instructions may include a maximum of four prefix bytes but any number of prefixes leaving the instruction no longer than fifteen bytes might be used for other purposes. One prefix which varies the meaning of the opcode for an instruction may cause the opcode to indicate a jump instruction, among other things.

A second field may include one byte of opcode which selects the particular operation to be performed. The opcode may also include smaller fields which define the direction of operation, the size of displacements, an encoding for a register holding an operand used in an instruction, or a sign extension. The opcode byte may include an addressing-mode specifier which indicates whether an operand used by the instruction is held in a register or a memory location.

A third field may include a MODR/M byte. Most instructions that refer to an operand in memory have a MODR/M byte following the opcode bytes to specify the address form to be used. This MODR/M byte indicates whether an operand used by the instruction is held in a register or in a memory location and, if in memory, whether displacement, base, and index values, and scaling factors are to be used in obtaining the offset needed for addressing. The field can indicate a register containing an operand, twenty-four different indexing modes for memory addresses, a base register (if no SIB byte is present), and it may complete the opcode. Certain encodings of the MODR/M byte for thirty-two bit instructions indicate that a scale/index/base (SIB) byte is used.

A fourth scale/index/base (SIB) byte of an instruction is used with thirty-two bit instructions to encode a base register which stores a base value, an index register which stores an index value, and a scaling factor where the addressing-mode specifier indicates that an index register is to be used in computing the offset address.

A fifth displacement field of one, two, or four bytes may be included when the addressing-mode specifier indicates that a displacement is to be used to compute the offset address of an operand. The displacement value is encoded as a signed integer of eight, sixteen, or thirty-two bits.

A sixth immediate field of one, two, or four bytes allows an operand to be stored as a part of the instruction.

In any instruction used by the i486 microprocessor, certain of these instruction fields are used and certain are not used. Because different fields are included in different instructions, instruction lengths differ from instruction to instruction and the decoder must be able to discern one field from another.

Typically, when an instruction is encountered by the decoding unit of Intel microprocessors, the prefix bytes are handled separately by a prefix state machine in the decode unit; and each byte of prefix requires one clock period to decode. One form of prefix (the 0Fhex prefix) is used to vary the meaning of the opcode. In the thirty-two bit mode of addressing, some of these instructions which are changed by the 0F prefix become move instructions when so prefixed. These prefixed move instructions in thirty-two bit addressing mode involve only register-to-register transfers involving a control or debug register.

Any move instruction with a MODR/M byte uses the value placed in the two bit MOD field of the MODR/M byte to designate the type of move involved. When the MOD field bits are 00, 01, and 10, a transfer which involves memory is indicated. The bits 11 in the MOD field, on the other hand, indicate transfers which involve only registers. Since these 0F prefixed move instructions in thirty-two bit addressing mode involve only register-to-register transfers, any value in the MOD field of the MODR/M byte other than 11 is invalid.

Because the instruction set for the earlier Intel microprocessors was not so complex, the structure of some software written for earlier Intel microprocessors differs from that written for later processors. Certain software designed for earlier Intel microprocessors may, in fact, cause bits other than the bits 11 to appear in the MOD field of the MODR/M byte of a 0F MOV instruction. This, in turn, may cause advanced processors to treat various instruction bytes as though they were SIB or displacement bytes even though such bytes do not exist in an 0F prefixed move instruction. The apparent addition of these bytes to the instruction can confuse the determination of the length of the instruction by the decode unit and cause incorrect hardware functioning.

For example, the decode unit of the processor includes a number of logically distinct portions for decoding the different portions of the instructions furnished. These include portions for decoding the opcode field, for decoding the MODR/M field, and for decoding the SIB byte. The decode circuit also includes circuitry for extracting the data from the instruction which constitutes the displacement value and the immediate value.

The decode unit also includes circuits which individually count the number of prefix bytes which are a part of the instruction, the number of bytes which are a part of the opcode, the number of bytes of displacement data in the instruction, and the number of bytes of immediate data in the instruction. These circuits provide their count values to a prefetch pointer generation circuit which generates a value sent back to the prefetch unit to indicate the beginning of the next instruction and to an instruction length generation circuit which generates a value sent down the pipeline to indicate the length of the instruction being processed.

The decode unit decodes the opcode byte and the middle three bits of the MODR/M field to determine the meaning of the instruction. The MODR/M byte is decoded simultaneously and indicates whether there is a MODR/M byte present and whether there is a SIB byte. The SIB byte is also decoded simultaneously. The decoding of the opcode and the MODR/M and SIB bytes indicate where various operands of the instruction are stored. The decoding of these bytes provides values to the counting circuits. The combination decoded from the opcode, MODR/M, and SIB fields indicate the length of the instruction which is the opcode. The opcode and the MODR/M fields together indicate whether there are displacement bytes in the instruction and how many there are. The opcode by itself also determines the number of bytes of immediate code in the instruction. This allows the position of any displacement value and any immediate value to be determined and these values to be extracted from the correct positions in the instruction so that they may be transferred to the pipeline. Consequently, if these values are incorrect, then displacement and SIB bytes may be incorrectly determined to exist and the length of the instruction may be incorrectly computed.

In order to allow software designed for earlier Intel microprocessors to function with the more modern Intel microprocessors without causing the errors described, the apparatus of this invention has been designed.

FIG. 1(b) illustrates the coding for a MOV instruction used in thirty-two bit addressing mode which includes an 0F prefix. FIG. 1(c) illustrates another coding for a MOV instruction used in thirty-two bit addressing mode which includes another such 0F prefix. As may be seen, the two instruction are essentially identical; they vary only in the two lowest order bits of the opcode. These two instructions and a number of similar instructions provide register-to-register transfers using control and debug registers in the microprocessor. The last two bits of the opcode field designate which transfer to or from the control or debug registers is involved, and the REG and R/M fields of the MODR/M byte designate the registers involved in the transfer. In every instruction, the two bits of the MOD field of the MODR/M byte indicates that the transfer is to be a register-to-register transfer. There are no 0F prefixed operations which include a MOV opcode which involve a memory transfer. Consequently, since memory is not involved in the transfer, no offset need be provided so the SIB and displacement fields of an instruction are not utilized.

However, as pointed out above, it is possible for programs written for earlier models of the Intel microprocessors to be coded in a manner that they include other than the bits 11 in the MOD field of the MODR/M byte for an 0F move instruction. For example, the bits may indicate a memory operation in which a displacement value or a register encoding is used to determined a memory address. In such a case, the instruction will be considered invalid by the processor and generate an error indication. Alternatively, that instruction and the instructions which follow may be misinterpreted by the processor thereby causing an error in operation. For example, the length of a displacement value might be included in an instruction length sent to the pipeline from the decoder unit.

FIG. 2 illustrates a block diagram of a portion of a microprocessor which may utilize the present invention to process instructions. The microprocessor includes a prefetch unit 20 which fetches from storage the instructions to be processed so that they may be furnished to the pipeline in the appropriate one clock period steps. Instructions are provided by the prefetch unit 20 to the I unit 22 which decodes each instruction, generates microcode vectors in response to the decoded values, and transfers the microcode vectors generated to the pipeline for execution along with a request to the pipeline to accept the instruction. The I unit 22 includes a first prefix state machine 23. The prefix state machine 23 actually includes a number of individual state machines each of which handles one of the different types of prefixes discussed above. One of these state machines is a 0F prefix state machine which decodes 0F prefixes. Each of the prefix state machines included in the state machine 23 is a two-state state machine that decodes that prefix, and provides signals indicating the meaning of the prefix to a decode circuit 21 of the I Unit 22. These signals are control signals which essentially vary the manner in which the I Unit decode circuitry 21 responds to a particular opcode. That is, the decode circuitry 21 of the I Unit 22 is a large programmed logic array in the preferred embodiment which receives the opcode and decodes it to produce signals which, without a prefix, cause microcode vectors to be generated by a particular portion of a microcode generating section 24 of the I Unit 22 and by a microcode ROM section 25 of a C Unit 27. In the presence of a prefix signal, these signals generated by the decode circuit 21 are mapped to and generated by a different section of the microcode generating section 24. It should be noted that although microcode generating portion 24 is, in a preferred embodiment of the invention, a programmed logic array, it may also be a microcode ROM which serves an identical purpose.

It should be noted that the decode circuit 21 provides signals indicating the length of the instruction. These signals may be used to generate a prefetch pointer value so that the beginning of the next instruction may be correctly selected by the prefetch unit 20. Similarly, the state machine 23 includes circuitry which counts the number of bytes of prefix so that this value may be included in the length of the instruction transferred to succeeding stages of the pipeline. The I unit 22 shown in the figure also includes a circuit 10 constructed in accordance with the present invention.

A thirty-two bit address instruction 0F MOV is one type of instruction which utilizes a 0F prefix in the manner described above. The 0F prefixed MOV instruction is a register-to-register move instruction by which data is moved to and from various control and debug registers. The 0F prefix indicates to the decode circuit 21 that the normal microcode vector produced by the opcode portion of the instruction is not to be generated but a different microcode vector is to be generated to produce a move operation. The signals generated by the 0F prefix state machine in response to the 0F prefix essentially causes the decode circuit 21 to access another section of the microcode generating section 24 to produce its output vector. The instruction illustrated in FIG. 1(b) is such an 0F MOV instruction.

As may be seen, the MOV instruction includes a prefix byte, an opcode byte, and a MODR/M byte. The MOD field of the MODR/M byte displays the bits 11. These bits indicate that the transfer is from one register to another. Since the operation is a register-to-register transfer, no memory access is required and no offset into memory need be generated. Consequently, no SIB byte is included in the instruction. For the same reason, no displacement byte is included in the instruction. Since the operation is a register-to-register transfer, the operands reside in registers so no immediate bytes are involved.

Some programs produced for older Intel microprocessors for one reason or another include the 0F prefix and the opcode for the MOV instruction but have some other indication in the MOV field of the MODR/M byte. In order to allow this software to be utilized with the more advanced Intel microprocessors, the present invention has been devised.

The present invention makes use of the fact that the only valid bits which can exist in the MOD field are 11 for an 0F prefixed register-to-register move. Consequently, whenever the 0F prefix is detected along with the first six bits of the opcode indicating a register-to-register move instruction, the instruction is treated as though it were a register-to-register move instruction no matter what bits are included in the MOD field. In effect, the MOD bits 00, 01, and 10 are aliased and interpreted as if they were the bits 11. The effect of this is that no displacement byte or SIB byte is considered by the processor in carrying out the instruction even though these bytes may be, in fact, generated. In fact, in the preferred embodiment of the invention the generation of signals indicating the presence of the displacement and SIB bytes are inhibited.

Figure 3:
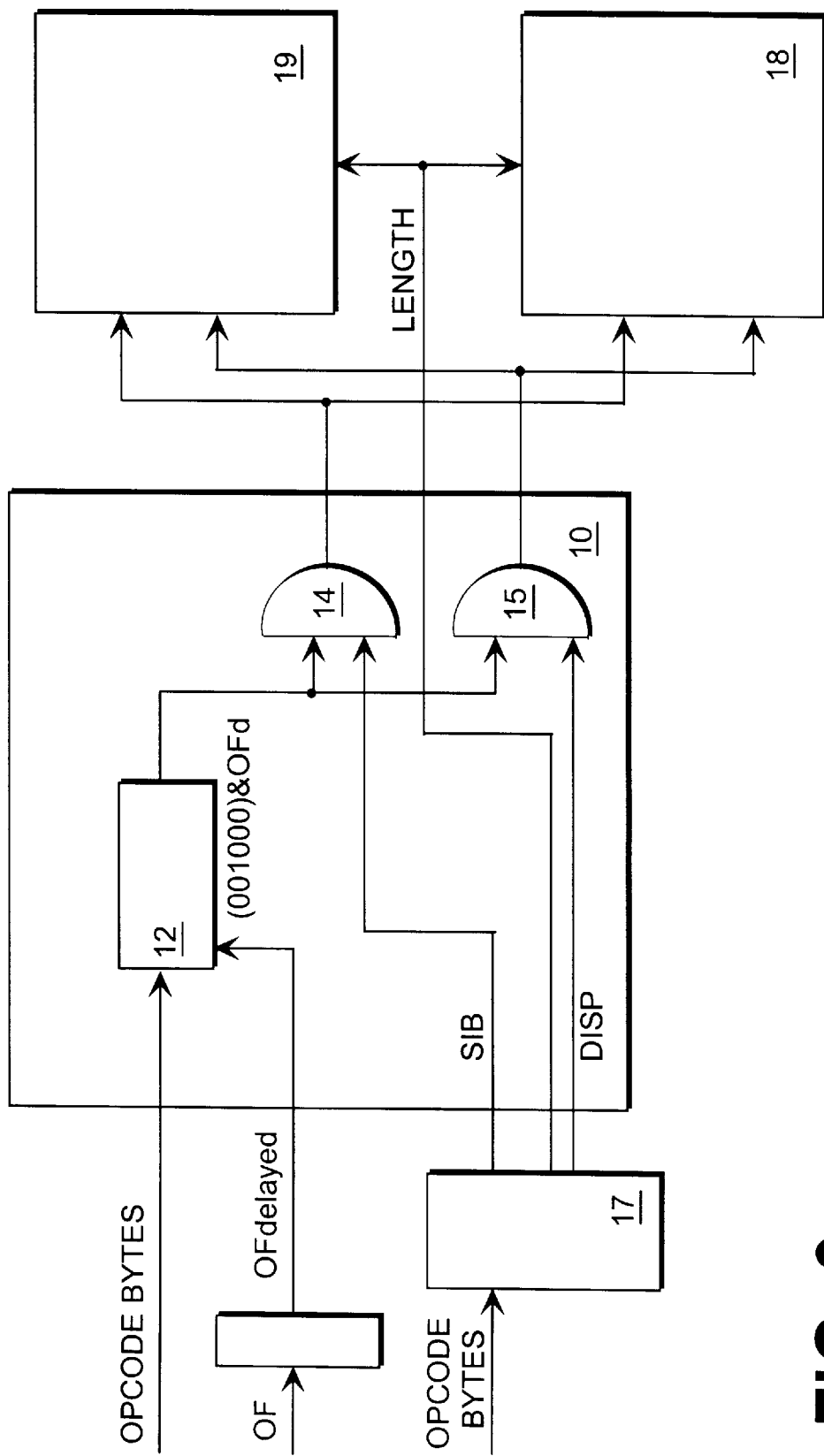
FIG. 3 is a diagram illustrating in block form details of circuitry included in FIG. 2 for carrying out the present invention.

FIG. 3 is a diagram illustrating in block form circuitry for carrying out the present invention. The circuit 10 which is illustrated is a portion of the I unit 22. The circuit 10 includes a comparator 12 which receives the opcode bytes furnished by the prefetch unit 20. The comparator 12 compares the bytes of the present instruction with the values 0F(hex) and 001000 (the six highest valued bits of the opcode which indicates one of the thirty-two bit register-to-register move instructions). If the values are the same, the comparator generates a signal which is transferred to the input of a first AND gate 14 and a second AND gate 15. The AND gates 14 and 15 also receive signals from a logic circuit 17. The logic circuit 17 is in the preferred embodiment a programmed logic array (PLA) which is part of the decode circuit 21 and decodes the displacement and SIB bytes of the instruction. The logic circuit 17 receives the opcode bytes of an instruction and generates the necessary microvectors if SIB and displacement bytes are present in the instruction. The circuit 17 also furnishes a signal indicating the presence of a SIB byte in the instruction to the AND gate 14 and other signals indicating the presence of any displacement bytes to the AND gate 15 and its length to a pair of circuits 18 and 19.

The AND gate 14 furnishes an output signal which is transferred to an instruction length calculator logic circuit 19. The instruction length calculator logic circuit 19 provides an indication of the instruction length. This value is used to indicate the length of the present instruction to the circuitry of the microprocessor following the I unit 22 in the pipeline. The value furnished by the AND gate 14 causes the instruction length calculation logic circuit 19 to disregard any SIB byte which is apparently present in the instruction being processed. When the SIB byte is disregarded in the length calculation, the length value determined will not include the length of any SIB byte; and an end point for that instruction will occur one byte sooner in the stream of instructions furnished by the I unit 22.

Similarly, the signal indicating the absence of a SIB byte is sent from the AND gate 14 to a prefetch pointer calculation logic circuit 18. The prefetch pointer calculation logic 18 generates a pointer value which is used to determine the beginning of a next instruction provided by the circuitry of the prefetch unit 20 shown in FIG. 2. The value furnished by the AND gate 14 causes the prefetch pointer calculation logic circuit 18 to disregard any SIB byte which is apparently present in the instruction being processed. When the SIB byte is disregarded in the prefetch pointer calculation, the prefetch pointer will not include that length and the beginning point for the next instruction furnished to the I unit 22 will occur one byte sooner in the stream of instructions furnished by the prefetch unit.

The AND gate 15 furnishes an output signal indicating the absence of any displacement bytes in an 0F prefixed MOV instruction. The absence signal is also transferred to the instruction length calculation logic circuit 19. The signal indicating the number of bytes of information is also transferred to the instruction length calculation logic circuit 19. The value from the circuit 17 and the signal furnished by the AND gate 15 causes the instruction length calculation logic circuit 19 to disregard any displacement bytes which are apparently present in the instruction being processed. When the displacement bytes are disregarded in the length calculation, the length sent to the pipeline will not include any length for a displacement byte; and an end point for that instruction will occur at a correct point for that instruction.

Similarly, the signal indicating the absence of a displacement byte in a 0F prefixed MOV instruction is sent from the AND gate 15 to the prefetch pointer calculation logic circuit 18. The length value furnished by the circuit 17 and the presence signal furnished by the AND gate 15 cause the prefetch pointer calculation logic circuit 18 to disregard any displacement bytes which are apparently present in the instruction being processed. When the displacement bytes are disregarded in the prefetch pointer calculation, the prefetch pointer will not include that length and the beginning point for the next instruction will occur a number (the displacement length) of bytes sooner in the stream of instruction furnished by the prefetch unit.

The details and operation of circuitry for generating the length of an instruction are disclosed in U.S. patent application Ser. No. 07/831,825, entitled *Rotators in Machine Instruction Length Calculation,* E. Grochowski, filed Feb. 6, 1992, and assigned to the assignee of the present invention. Additional details of the decode circuitry which generates the values used in counting the length of the various portions of each instruction are disclosed in U.S. patent application Ser. No. 07/927,707, entitled *Method And Apparatus For Decoding Conditional Jump Instructions In A Single Clock In A Computer Processor,* S. Zaidi, filed on even date herewith, and assigned to the assignee of the present invention.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method of decoding an instruction in a processor, the method comprising the steps of:
   (a) decoding one or more bit fields of the instruction simultaneously;
   (b) determining that a first portion of the one or more bit fields conflicts with a second portion of the one or more bit fields; and
   (c) interpreting the first portion of the one or more bit fields as if an aliased bit pattern were substituted for the first portion of the one or more bit fields.

2. The method of claim 1 further comprising the steps of:
   (d) calculating an instruction length based on decoding the aliased bit pattern.

3. The method of claim 2 further comprising the steps of:
   (e) providing the instruction length to prefetch pointer logic.

4. The method of claim 1 further comprising the steps of:
   (d) inhibiting the first portion of the one or more bit fields decoded in the step (b) from contributing to calculating an instruction length.

5. A method of determining the length of an instruction, the method comprising the steps of:
   (a) decoding a first field of the instruction to generate a first instruction length input, the first instruction length input being indicative of the length of the instruction;

(b) decoding a second field of the instruction to generate a second instruction length input, the second instruction length input being indicative of the length of the instruction;

(c) selectively suppressing the second instruction length input from being used to determine the length of the instruction.

6. The method of claim 5, wherein the step (c) further comprises the steps of:

generating an inhibit signal responsive to detecting a predetermined opcode; and using the inhibit signal to suppress the second instruction length input from being used to determine the length of the instruction.

7. The method of claim 5, wherein the step further comprises the steps of:

generating an inhibit signal responsive to detecting a predetermined opcode and a predetermined prefix; and using the inhibit signal to suppress the second instruction length input from being used to determine the length of the instruction.

8. A processor comprising:

a first decoder for decoding a first portion of a target instruction and providing a first instruction length signal;

a second decoder for decoding a second portion of the target instruction and providing a second instruction length signal; and instruction length calculation logic coupled to receive the first and second instruction length signals, the instruction length calculation logic coupled to receive an inhibit signal for selectively preventing the second instruction length signal from being used by the instruction length calculation logic to calculate an instruction length of the target instruction.

9. The processor of claim 8 further comprising:

prefetch pointer logic coupled to receive the first and second instruction length signals, the prefetch pointer logic coupled to receive the inhibit signal for selectively preventing the second instruction length signal from being used by the prefetch pointer logic to calculate a prefetch instruction length.

10. The processor of claim 8 further comprising:

a prefix decoder for decoding a prefix portion of the target instruction, wherein the prefix decoder and the first decoder are coupled to selectively provide the inhibit signal.

11. A processor comprising:

a first decoder for decoding a first portion of a target instruction and providing a first instruction input;

a second decoder for decoding a second portion of the target instruction and providing a second instruction input; and an inhibit signal for suppressing the second instruction input based upon detecting a predetermined opcode.

12. The processor of claim 11 further comprising:

a prefix decoder for decoding a prefix portion of the target instruction, wherein the prefix decoder and the first decoder are coupled to selectively provide the inhibit signal.

13. A method of decoding a target instruction in a processor, the method comprising:

(a) decoding one or more bit fields of an instruction simultaneously to produce a first instruction length input and a second instruction length input of the target instruction;

(b) determining that the first instruction length input indicates that the target instruction is of a first length, and the second instruction length input indicates that the target instruction is of a second length; and (c) inhibiting the second instruction length input from contributing to calculating an instruction length of the target instruction.

* * * * *